United States Patent [19]

Lange et al.

[11] 4,179,607

[45] Dec. 18, 1979

[54] GAMMA CAMERA SYSTEM WITH IMPROVED MEANS FOR CORRECTING NONUNIFORMITY

[75] Inventors: Kai Lange, Vedbaek; Jørgen Jeppesen, Mariehøj, both of Denmark

[73] Assignee: General Electric Company, Schenectady, N.Y.

[21] Appl. No.: 895,895

[22] Filed: Apr. 13, 1978

[51] Int. Cl.[2] .................................... G01T 1/20

[52] U.S. Cl. .................................... 250/363 S; 364/414

[58] Field of Search .................... 250/363 S; 364/414; 358/110, 111

[56] References Cited

U.S. PATENT DOCUMENTS

| | | | |
|---|---|---|---|
| Re. 28,451 | 6/1975 | Spleha et al. | 250/363 S |
| 3,878,373 | 4/1975 | Blum | 363/414 |

*Primary Examiner*—Davis L. Willis

*Attorney, Agent, or Firm*—Ralph G. Hohenfeldt

[57] ABSTRACT

In a gamma camera system, means are provided for correcting nonuniformity or lack of correspondence between the positions of scintillations and their calculated and displayed x-y coordinates. In an accumulation mode, pulse counts corresponding with scintillations in various areas of the radiation field are stored in memory locations corresponding with their locations in the radiation field. A uniform radiation source is presented to the detectors during the accumulation mode. When a predetermined maximum number of counts is reached in several memory locations, accumulation is interrupted at which time other locations have fewer counts in them. In the run mode, counts are stored in corresponding locations of a memory and these counts are compared continuously with those stored in the accumulation mode. Means are provided for injecting a number of counts during the run mode proportional to the difference between the counts accumulated during the accumulation mode in a given area increment and the counts that should have been obtained from a uniform source.

8 Claims, 6 Drawing Figures

GAMMA CAMERA SYSTEM WITH IMPROVED MEANS FOR CORRECTING NONUNIFORMITY

BACKGROUND OF THE INVENTION

This invention relates to scintillation cameras, commonly called gamma cameras, and is particularly concerned with improving nonuniformities or lack of positional correspondence between the distribution of scintillations or radiation events in incremental areas of the camera field and in the displayed image resulting from the scintillations.

A substantial amount of the disclosure herein is similar to that in co-pending U.S. patent application Ser. No. 787,122, filed Apr. 13, 1977 now U.S. Pat. No. 4,115,694. The present application discloses and claims improvements in the invention set forth in the cited application. Both applications are owned by the same assignee.

As explained in the prior application, in nuclear medicine, gamma camera systems are used to detect gamma ray photons emitted from a body in which a radioisotope has been infused. Scintillations occur where photons are absorbed by crystalline material. A typical system is based on the camera of Anger as disclosed in U.S. Pat. No. 3,011,057. As in the Anger camera, the camera disclosed herein comprises an array of photosensitive devices such as photomultiplier tubes, usually hexagonally arranged, having their input ends adjacent a light plate or disk. Beneath the disk is a scintillation crystal which converts incoming gamma photons into light photons or scintillations. A collimator is interposed between the scintillator and the emitting body so that emitted photons will impinge substantially perpendicularly to the planar scintillation crystal.

The array of photomultiplier tubes views overlapping areas of the scintillation crystal. The tubes produce a pulse for each scintillation event. Well-known electronic circuits are used to produce signals representing the x and y coordinates of the scintillations. A pulse height analyzer determines if the pulses are within amplitude limits and, if they are, a z signal is produced which controls a cathode ray oscilloscope display to produce a point of light on its screen at the x and y coordinates corresponding with those of the scintillation event intercepted by the camera. A photographic film may be used as an image integrator of the large number of light spots appearing on the screen of the cathode ray tube. A substantial number of events is required to make up the final picture of radioisotope distribution in the body tissue.

It is known in connection with systems of this type, that if a standard source having uniform isotope distribution is placed close to the crystal and a photograph is made of the image on the display tube, the photograph will show nonuniformity which results from so-called "hot spots" under each photomultiplier tube and "cold spots" between the tubes. The transitions between hot and cold areas are gradual rather than abrupt. In other words, a spot or scintillation event actually occurring between photomultiplier tubes is sensed as being partially shifted under the tubes, causing a decrease in spot density between the tubes and an apparent increase in spot density under the tubes.

The prior application cited above discloses and claims a new scheme for the light spot distribution density in the display to correspond with the actual distribution of gamma ray emissions from the body in incremental areas of the camera field. The prior application discloses a system that is operated in two different modes, a count accumulate mode and a run mode. In the accumulate mode, a reference count is generated and it is used as a basis for determining the number of artificial counts that should be injected in incremental areas of the radiation field to correct for the lack of correspondence between the actual and displayed radiation events. During the accumulate mode, a disc having a radioactive isotope distributed uniformly over its area is placed in the camera field. During this time the scintillation counts for incremental areas in the field are placed in memory locations having coordinates corresponding with the incremental areas or locations where the detectors seemingly detected the scintillation events. When in the system described in the cited application, when one of the memory locations was filled, the accumulate mode was terminated and this left all other memory locations partially filled even though use of a uniform source could be expected to result in all of the locations being completely filled within the same counting time interval.

In the prior application as in this application, following the accumulation mode, the apparatus is switched to operate in the run mode. In the run mode, radiation produced by a body which is infused with a radioisotope produces the radiation field which is detected. During the run mode, the most significant bits of the binary numbers representing the counts in the memory locations obtained during the accumulate mode are constantly compared with the number of counts being obtained in corresponding incremental areas when the body is producing the radiation field. The prior application discloses how to inject just the right number of correction pulses to make up the difference between the number of counts that should be obtained during the run mode and those that are actually being obtained. Thus, each incremental area during the run mode receives a number of correction pulses which is proportional to the difference between the actual count received for the memory location during the accumulate mode and the count that was accumulated in the filled memory location. A unique feature of the system described in the prior application is that the correction pulses were always injected at proper regular intervals while the run mode was in progress as opposed to having all of the correction pulses injected at the end of a run.

Experience with the system described in the prior application demonstrated great improvement in the uniformity of the displayed image over any correcting means that had been used before. However, faint nonuniformities within the bounds of visual acuity could still be discerned. The inventors in this application perceived that the residual problem resulted from overcorrection resulting from what was seemingly a truly proportional scheme.

SUMMARY OF THE INVENTION

In accordance with the present invention, the system still uses two modes of operation. One is the calibration or accumulation mode and the other is the run mode. Contrary to the procedure in the prior application, however, in this case, during the accumulate mode a substantial number of memory locations are allowed to fill before the accumulate mode is terminated. Since it takes more time to fill a substantial number of memory locations, the other locations become closer to being filled than was the case when accumulation was interrupted when only one location was filled. In the prior system, where the number of counts in particular memory locations were drastically deficient, a very large number of artificial counts had to be injected to bring the locations up to the seemingly proper level. Too many artificial counts were thereby produced. In the improved system disclosed herein, the number of artificial or injected correction pulses is markedly reduced in which case there is closer conformity between the actual distribution of scintillation events and their distribution in the display.

A general object of this invention is to improve the correspondence between the points which make up the displayed image with the points in the radiation field in which the radiation events occur and are detected.

How this and other more specific objects of the invention are achieved will appear in the more detailed description of a preferred embodiment of the invention which will now be set forth in reference to the drawings.

DESCRIPTION OF A PREFERRED EMBODIMENT

Figure 1:
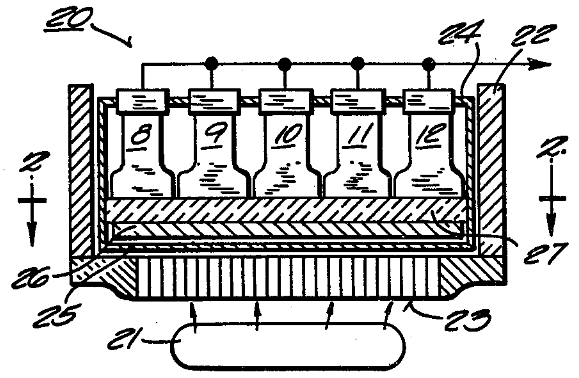
FIG. 1 is a schematic side view of a scintillation camera detector head, partly in section.
Figure 2:
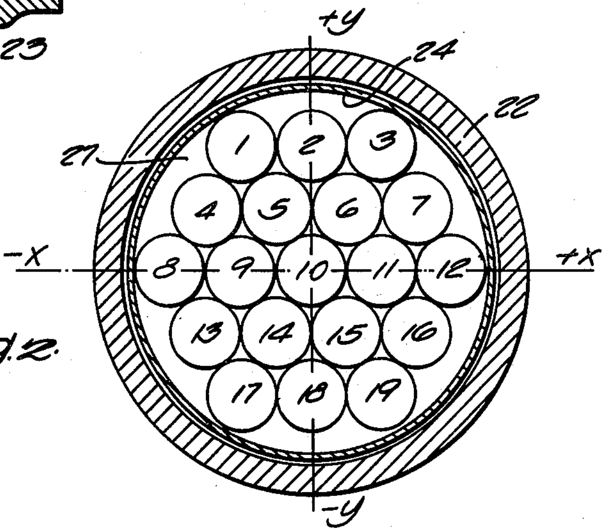
FIG. 2 is a schematic diagram of a section taken on a line corresponding with 2—2 in FIG. 1 and showing a hexagonally arranged array of photomultiplier tubes in a scintillation camera.

FIGS. 1 and 2 show schematic and vertical and transverse sections, respectively, of an illustrative scintillation camera. In FIG. 1, the camera is generally designated by the reference numeral 20. It is disposed over a body 21 which may be infused with a radioisotope whose photon emission pattern enables forming a visible image of the tissue in which the isotope is absorbed. Camera 20 intercepts photons which are emitted by the isotope which is usually a gamma ray emitter. The illustrated conventional camera comprises a radiation opaque housing 22 which has a collimator 23 fastened to its bottom. The collimator comprises an array of gamma radiation permeable tubes with impermeable material between them. Inside of housing 22 is a closed container 24 which has a gamma ray photon permeable bottom 25. Above bottom 25 is a planar disc 26 made of crystalline such as thallium activated sodium iodide which produced a scintillation event at any point where it absorbs a gamma ray photon. An array of photosensitive devices such as photomultipliers (PM) tubes 1–19 are located above crystal 26. The PM tubes are coupled to crystal 26 with a light pipe 27 which may be a glass plate. Scintillations in crystal 26 are detected by the PM tubes which each produce pulse output signals for each scintillation event detected.

As can be seen in FIG. 2, 19 PM tubes 1–19 are used in this example. They are arranged hexagonally about a central PM tube 10. 19 is a common number of tubes used in cameras but thirty-seven PM tubes are also quite commonly used. The improved nonuniformity correction system may be used with any practical numbers of tubes.

As is known, gamma cameras of the type just outlined cooperate with electronic circuitry for computing analog signals which are representative of the x and y coordinates of each scintillation. For each scintillation there is an appropriate deflection and unblanking of the cathode ray tube and the scintillations are displayed as light spots on the face of the tube at coordinates with those of the scintillations. If a statistically sufficient number of counts is taken, an image of the part of the body infused with the radioisotope may be visualized on the face of the cathode ray tube.

It is well-known that even when a test object having substantially uniform radioisotope distribution is presented toward the input end of a gamma camera such as the one described above, the computed coordinates of the scintillations tend to bunch up when displayed, thus exhibiting a phenomena which is characterized as "hot spots" under and near each PM tube and "cold spots" between them. The intensity differences between the tubes are gradual but, without correcting for them, they are visible on the display tube.

Figure 3:
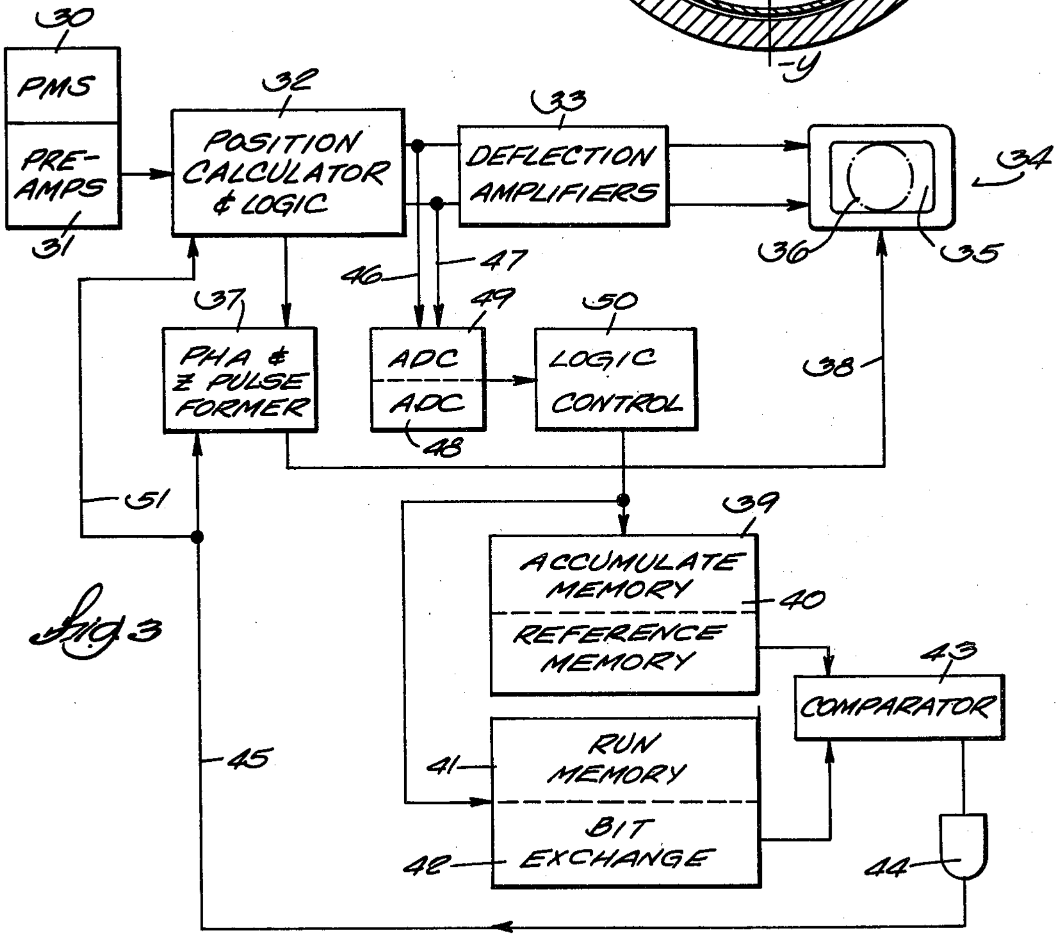
FIG. 3 is a block diagram of a part of a scintillation camera system employing the improved nonuniformity correction means.

Refer now to FIG. 3 which is essentially a flow diagram of a conventional gamma camera system in conjunction with the schematically represented components of the new system. The PM tubes are indicated collectively by the numeral 30. The analog signal outputs which these tubes produce for each scintillation event are processed in preamplifiers 31 and supplied to a computer that is generally designated as a position calculator and logic block 32 which is conventional and is operative to calculate for coordinate signals $+x$, $-x$, $+y$ and $-y$ and to put out pairs of x and y coordinate signals which are supplied to the x and y deflection amplifiers in the block 33 for the cathode ray tube. The deflection amplifiers drive electrostatic or electromagnetic deflection means in a cathode ray oscilloscope (CRO) display which is generally designated by the numeral 34. The face plate or display screen of CRO 34 is marked 35. A displayed image is symbolized by the broken line circle 36.

As is known, all coordinate signals do not necessarily result in an intensity change, such as a light spot occurring, at a corresponding position on the CRO screen 35 or whatever type of display is used. Only PM tube output pulse signals which fall within a predetermined energy window of a pulse height analyzer result in intensity changes or, in this embodiment, production of light spots. Thus, in this case as in conventional systems, a pulse height analyzer and z pulse former 37 are provided. Analog signal pulses which are within the window limits of the analyzer produce z pulses which are delivered to CRO 34 and unblank it so that a light spot will be produced at the coordinates of the signals coming from the deflection amplifiers 33. z or unblanking signals are conducted to the CRO by way of line 38.

If a writing device, not shown, which produced hard copy were used for display of the image instead of the CRO used herein, the z pulses might be used to cause the device to put a mark on image recording paper, for instance, or to produce some intensity change other than a light spot. Hence, it should be understood that the term "intensity change" is intended to include making light spots and other forms of writing.

Traditional practice is to reduce nonuniformities in the display to the extent possible by tuning or balancing the PM tube outputs. As in known, this procedure involves presenting a source having a uniform distribution of radioisotope toward the camera input and then tuning the electronics until the best uniformity is obtained on the display screen.

In an embodiment of the present invention, a flood or flat field is obtained with a uniformly distributed radiation source presented to the camera input after it has been pretuned and at any time that calibration of the system is desired. The number of counts of scintillation events in the radiation field viewed by the camera are stored in a digital memory matrix 39 which is identified as an accumulate memory. Typically, for this illustrative example, the memory has 64×64 locations for 12 bit binary numbers so the maximum number of counts that can be stored in each location may be $2^{12}$ or 4096. The least significant bits of the accumulated counts are dropped and the six most significant bits are retained. The most significant bits become the reference memory 40 after the accumulate mode is terminated. In this improved system, termination of the accumulate mode is automatic when a plurality of locations in the accumulate memory are filled in which case most of the other locations will contain an equal or lesser number of counts due to the inherent nonuniformity which was discussed above. The vacancies left by dropping the least significant bits in the accumulate or reference memory 40 in FIG. 3 are used as a six bit memory during the run mode. In the abovementioned prior application, the accumulate mode was terminated when a small number, at least one, of the accumulate memory locations became filled. In the present case, as implied above, many more are filled before the accumulate count is terminated. By way of example and not limitation, in one practical embodiment, accumulation is not terminated until 256 locations are filled. This amounts to filling just a little over 6% of the memory locations. Of course, it will be understood that the number of locations to be filled might vary in systems with different manufacturers and would depend on what degree of correction a particular system might require. Filling only 50 cells might be appropriate in some cases and filling 300 might be appropriate in other cases. The number of counts to fill a memory location might be increased to increase statistical accuracy, but at the expense of taking more time to accumulate, or the number of counts might be reduced below 4096, but at the expense of the accuracy. The areas in the radiation field or detectors from which the counts for filled memory locations are derived might also be variously selected in accordance with the characteristics of the particular system in which the improved nonuniformity correction means is used.

After the accumulation mode is terminated, the run mode may be put into effect. In the run mode a body infused with radioisotope is in view of the camera for being imaged. During the run mode the pulse counts are delivered to run memory 41. The six planes which are made available by dropping the least significant bits may be used for storing the pulse counts. Locations in the run memory have x and y coordinate positions corresponding with incremental areas in the scintillation camera field. During the run mode the contents of run memory 41 are compared to the contents of reference memory 40 with a comparator 43 as shown in the schematic diagram of FIG. 3. At any time that the number of counts in a run memory location is equal to or exceeds the number of counts in the corresponding location of the reference memory, comparator 43 is operative to have its output signal gated, with a gate 44, for delivering a pulse by way of line 45 to the z pulse former 37. Every time a signal is gated, an additional z pulse and intensity change or light spot occurs in the corresponding incremental area on display screen 35 of the CRO. Thus, there are provided as many additional z pulses or correction pulses for each location or area increment as are required to make up the difference between the counts that should have been in the corresponding location of the accumulate memory for a uniform source and the number of counts that are in the multiple filled locations of the accumulate memory. When the run memory locations are filled, the system recycles and the correct proportion of additional counts or pulses are supplied on a real time basis during the entire run mode.

In FIG. 3, the flow diagram indicates a bit exchange procedure by a block 42 wherein the most significant bits of the run memory binary digital numbers are exchanged to the positions occupied by the most significant bits before comparison in comparator 43 with the most significant bits of the counts in the reference or accumulate memory. This permits, as is explained in detail later, injecting the additional pulses or counts periodically during filling of the locations in the run memory instead of waiting to correct the deficiency in each location after the comparator has determined that the number of counts in the run mode memory exceeds the number of counts in the corresponding location of the reference memory. This optimizes nonuniformity correction for use on low count images. The bit exchange and comparison procedures discussed in this paragraph are also described in the above cited patent application.

Further in FIG. 3 it will be noted that the accumulate mode and the consecutive run mode x and y coordinates for the scintillation events are supplied, respectively, by way of lines 46 and 47 to a pair of analog-to-digital converters (ADC) 48 and 49. The digital output signals from the converters are addressed by means of logic and control circuitry 50 to the accumulate memory 39 during the accumulate or calibrate mode and to the run memory 41 during the run mode.

Figure 5:
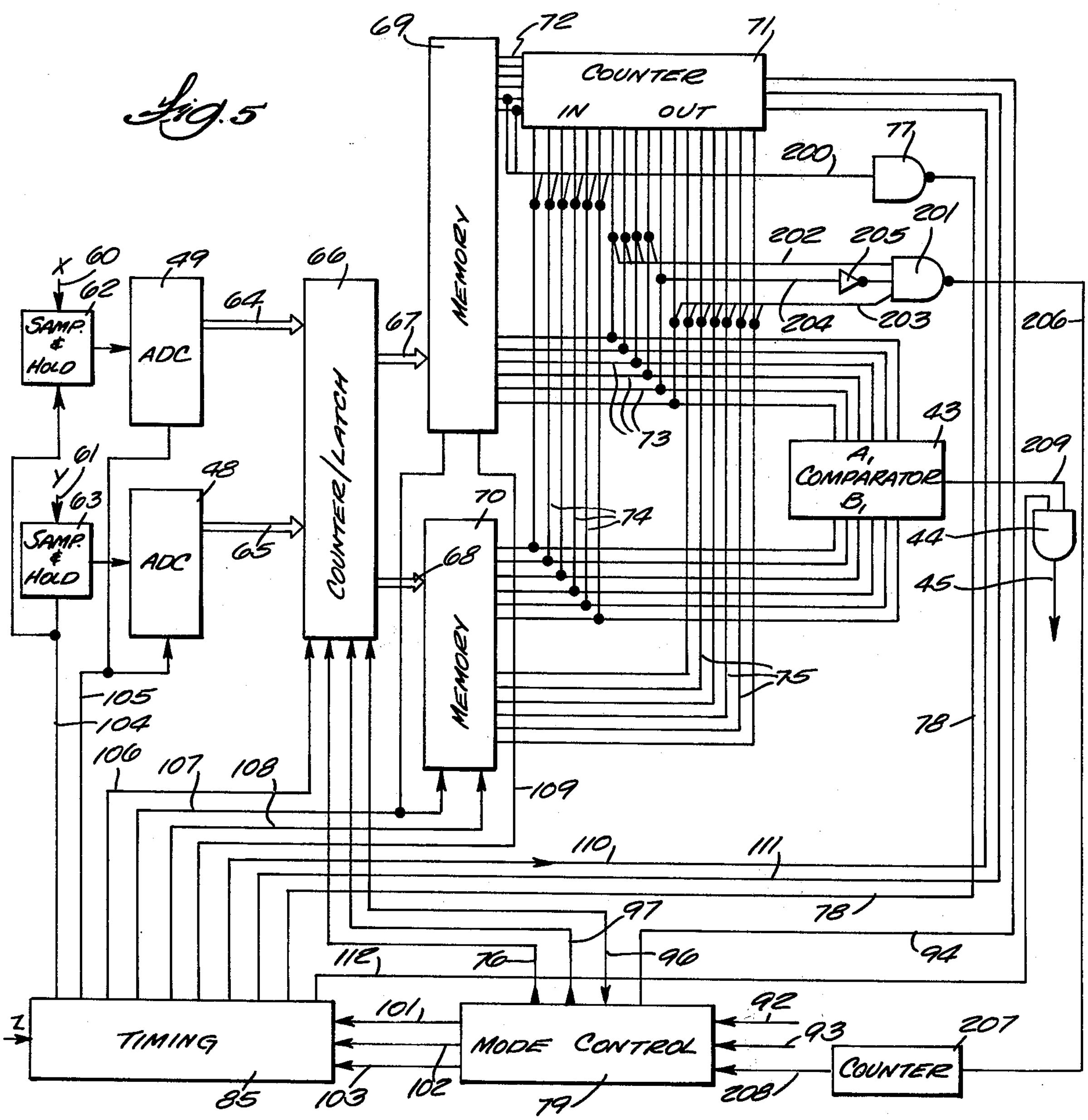
FIG. 5 is a circuit diagram showing the essential features of the improved nonuniformity correction means.

A more detailed description of the nonuniformity correction circuit will now be given in reference to FIG. 5. In this figure, the analog x and y coordinate signals for each scintillation event come in on lines 60 and 61 from the position calculator 32 which was referred to in discussing the generalized flow diagram of FIG. 3. In FIG. 5, the analog signals are supplied to a pair of sample and hold devices 62 and 63. These devices assure that the analog signals will be stable when they are processed by adjacent analog-to-digital converters (ADCs) 48 and 49. Each of these ADCs are preferably capable of converting the analog input signals to 5 to 6-bit digital output signals. Fast ADCs are used which are capable of converting in less than a microsecond. The output signals from ADC 49 are conducted with a bus 64 that is capable of handling 5 or 6-bit digital numbers which are effectively x location memory addresses. A similar bus 65 conducts the 5 or 6-bit digital numbers, which are y location addresses, from ADC 48. The digital numbers are fed to a counter/latch 66 whose purpose will be discussed later. From latch 66, the digital numbers are supplied by way of 5 or 6-bit buses 67 and 68 to memories 69 and 70, respectively. Memories 69 and 70 are equivalents of memories 39, 40 and 41 which were used in FIG. 3 for explanatory purposes. Memories 69 and 70 are used in both the accumulate and run or correction modes.

Figure 4:
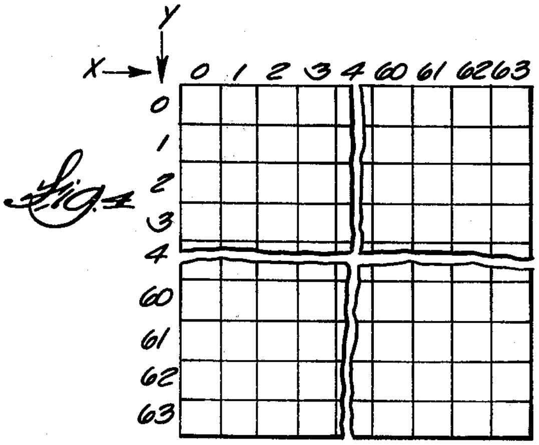
FIG. 4 is a diagram of one plane of a memory matrix for the purpose of explaining features of the invention.

In this embodiment, the memories are comprised of a matrix of 64×64 cells per plane and there are 12 planes so all vertically coincident cells comprise locations which are capable of storing a 12-bit binary number having a maximum value of decimal 4096. One of the memory planes is shown symbolically in FIG. 4 and is seen to comprise 0–63 or 64 bit locations in each direction. Each cell or bit in a plane has an xy coordinate which corresponds with the location of an incremental area under the array of PM tubes. Typically, the incremental areas in the camera field may be 24×24 mm.

In FIG. 5, the 5 or 6-bit digital signals corresponding with the positions of scintillation events, from ADCs 48 and 49 constitute addresses to memories 69 and 70. In the accumulation mode, each time the coordinate number, which has been converted to a digital number, addresses the digital memory, the entire stored binary number in that location in which the new count number is addressed is removed and incremented by one and returned to the memory for storage. The new digital numbers supplied to the memories cannot be incremented by one in the memories so the existing digital number of an x coordinate in a location is read out of memory over a bus composed of the 12 lines 72 and 74 by the counter 71 in which the readout number is incremented by 1 and fed back, by way of lines 73, to the same memory location from which the number was removed. Counts for the y coordinates are similarly processed by removing the existing counts in the addressed locations and feeding them to counter 71 by way of lines 72 and 74, and after incrementing by 1 in the counter, they are returned to memory 70 by way of lines 73 and 75.

The 12-bit counter/latch 66 mentioned earlier is not active during the accumulation mode. Its purpose is to assure that all locations in the memories are clear before accumulation is initiated. Counter/latch 66 is supplied with a clock signal by way of line 76 which is activated for a few milliseconds initially to run through all of the memory location addresses and write zeros into all locations. After the memory locations are all zero or cleared and during the accumulation and run modes, all address signals for scintillation event counts simply pass through the counter/latch 66.

As indicated above, by way of example and not limitation, the memories 69 and 70 have a depth of 12 bits so a maximum of $2^{12}$ or 4096 counts can be accumulated in each memory location. In the above cited application, during the accumulation mode, the event count was terminated when one memory location has its eight most significant bits all set to 1, corresponding to a content of $2^{12}-2^{4}$ or 4080 counts. When at least one location had this many counts, it was sensed on the inputs to NAND gate 77 and the output of this gate would change state. This change of state provided a signal over line 78 to the mode control module 79 which terminated any further accumulation of counts. In the improved system described herein, any number of memory locations appropriate to the correction required in a particular system are allowed to fill before the accumulation mode is terminated. In this particular example, and for the clarity that comes from using concrete numbers, the accumulation mode is terminated when 256 memory locations are filled. In some designs, perhaps filling 50 cells would be adequate while in others filling 300 or more might be indicated. Of course, in any design, the quality of the displayed image will be indicative of the number of cells that should be filled to get the proper correction.

When the selected number of memory locations are all filled, all of the other memory locations which store the counts for corresponding area increments in the field of the PM tubes will be less than full. It should be evident that if a large number of locations are allowed to fill during the accumulation mode, many of the other memory locations will be closer to being filled. As will be evident, this would reduce the number of correction pulses which are injected. In any case, there will be a deficiency of counts in many memory locations even though a uniform radioisotope source is in the camera field during the accumulation mode.

Now to be described is the manner in which, during the accumulation mode, a determination is made as to when a particular memory location is filled and as to when 256 or other chosen number of locations are filled. When the selected number of locations are filled, the accumulation mode, of course, is terminated.

As explained above, each time a location in memory is to receive an additional count, the value stored in that location is sent to counter 71, by way of bus lines 72 and 74. Counter 71 increments the binary number by 1 and returns it to the same location by way of bus lines 73 and 75. NAND gate 77 has its 12-bit input lines connected, respectively, to bus lines 72 and 74 by way of cable 200. In this example, during the accumulate mode, memory block 70 stores the six most significant bits of the count and memory block 69 stores the least significant bits. Gate 77 looks at the data out of the memories by way of bus lines 72 and 74. In this example, if the binary number input to gate 77 corresponds with a count of less than 4080, the output of gate 77 does not change state. This absence of a change of state is sensed over line 78 in the timing control 85 which, under this condition, feeds a signal back over line 110 which allows counter 71 to be incremented by 1. Every time gate 77 receives an input binary number corresponding with 4080 counts, indicative of that memory location being filled, the output of gate 77 changes state. This signal is sent by way of line 78 to the timing control which sends a return signal over line 110 which inhibits counter 71 from being incremented for any subsequent counts delivered to that particular memory location.

The binary number values appearing on output lines 73 and 75 from counter 71 are the same as the numbers on input bus lines 72 and 74 for each location. This permits the number of filled locations to be counted. The number of filled locations is determined with NAND gate 201. It has a 12-bit input. The inputs are connected respectively to output lines 73 and 75 from counter 71. One of the input lines groups is marked 202, another group is marked 203 and another line is marked 204. Line 204 has an inverter 205 in it. Because of the inverter, the output from NAND gate 201 will change when its input receives a binary number corresponding with 4080 counts or, in other words, $2^{12}-2^{4}$ counts. This output signal from gate 201 is sent by way of a line 206 to a counter 207. In this example, counter 207 is set for counting up to 256. When that count is reached, indicating that a corresponding number of memory locations have been filled, the counter provides an output signal over line 208 to mode control 79 which effectuates termination of the accumulate mode and switches the system to the run or patient examination mode.

In the run mode, which is in a sense, the correction mode, the memory is divided into two parts, the run memory 41 and the reference memory 40 which were mentioned briefly when FIG. 3 was being discussed. In this example, the six most significant bits of the accumulate mode counts are retained in memory block 70 in FIG. 5 which becomes the reference memory. The least significant bits of the accumulate or reference counts are dropped in memory block 69 and these locations are then available for storing the counts for the various incremental areas in the camera field during the run mode. Run memory 69 is a revolving memory as was described in connection with accumulation where, for each scintillation event, the content of the corresponding location in run memory 69 is incremented by 1 with counter 71. When all bits in any location in the run memory are set to one, the next event assigned to that location will turn all bits in the location to zero if the image run continues and each location will begin again to store counts until it is filled.

During the combination run and correction mode, a body which has been infused with a radioisotope is in the camera field of view. As the scintillation event counts for incremental areas of the field come into the run memory at locations corresponding with coordinates of the events, each run memory location is incremented by one. When a binary number which has six bits, in this example, or a maximum of 64 is counted the filled location recycles. Meanwhile, of course, points of light are continuously being formed on the CRO screen 35 to develop the image 36. In this improved embodiment, as in the embodiment shown in the above cited patent application, the digital numbers A in the run memory locations are continuously compared to the digital numbers B in the corresponding locations of the reference memory, using a comparator which is marked 43 in FIGS. 5 and 3. An output line 209 from the comparator constitutes one input to an AND gate 44. If A is greater than B is true, a correction pulse will be generated and outputted from gate 44 on its output line 45. The correction pulses are sent to the z pulse former 37 in FIG. 3 such that for each event causing a total number of counts in the run memory location in excess of the number of counts in the corresponding reference memory location, an additional z pulse will be formed and an additional spot will be inserted in the appropriate area increment in the image on monitor screen 35 to correct for nonuniformity. From the earlier discussion, it will be evident that incremental areas or memory locations which had a number of counts nearest to the number in the filled locations during the accumulate mode will receive fewer correction pulses than those locations which fill rapidly during the run mode. Adding additional correction pulses or light spots may begin as soon as any location in the run memory develops a count which is greater than the deficient count stored in the accumulated or reference memory in a corresponding location. Then when the number of additional counts is sufficient to bring the run memory location up to the level of the filled reference location, the run memory location is recycled as described above, in which case the number of corrections made in each incremental area is proportional to the size of the error for the area.

Figure 6:
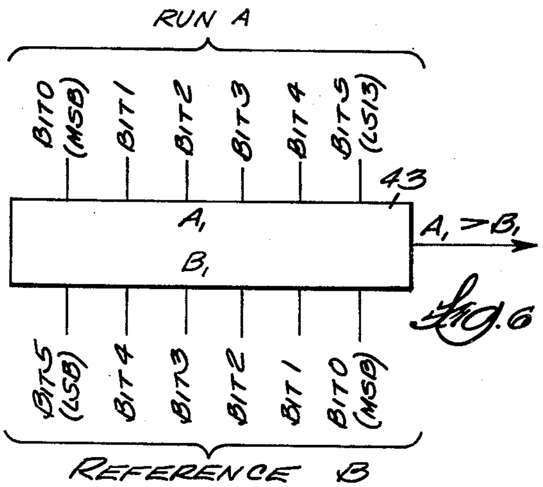
FIG. 6 is a diagram for facilitating explanation of how counts in an accumulator or reference memory are compared with counts in a run memory.

In the system described herein as in the above cited patent application, however, the memory outputs of run memory A and reference B are not compared directly. The bits in the run memory are interchanged, bit 0 by bit 5, bit 1 by bit 4 and bit 2 by bit 3 as illustrated in FIG. 6. The interchange is accomplished simply by connecting the least significant bit output pin of the memory to what is the normally most significant bit input pin of comparator 43 and connecting the most significant bit output pin of the memory to the least significant bit input pin of comparator 43 and similarly reversing the sequence of the intervening outputs and inputs. When counting run memory A locations from 0–63, A is greater than B will be true exactly as often $A_1$ is greater than $B_1$, because $B=B_1$ and all different combinations of bits occur in both A and $A_1$ just once. Interchanging the bits in the run memory A thus does not affect the correcting factor, but the correcting pulses will be more equally spaced in time. For example, $B=59$ means that four pulses of every 64 pulses are correction pulses. If the bits in A were not interchanged, the four correction pulses would occur as four pulses in succession at the end of each counting cycle. Now, for example, every sixteenth pulse would be a correction pulse where four correction pulses are required.

Refer to Tables 1 and 2 for a concrete example of how the number of correction pulses required in a location during a run mode can be predicted and how they can be interspersed over the count instead of only being added in succession after the count in a run location exceeds the count in a corresponding reference memory location. In Table 1 there are 64 column headings 0–63 in decimal form. Their corresponding digital numbers are written below the decimal numbers with the least significant bit (1sb) at the bottom of each column and with the most significant bit (msb) at the top. At the left, the positional values 32, 16, 8, 4, 2 and 1 of the bits are given for 0–63. Assume in this example that a particular reference memory location has the 53 counts stored in it which are indicated at the left of Table 1. This means that this particular location has a count 10 bits under that of the 64 counts in a filled accumulate memory location as indicated.

Table 2 is essentially an inversion of Table 1 where the most significant bit of Table 1 is interchanged with the least significant bit in Table 2. Thus, in Table 2 the top bit is least significant. The decimal value of the binary number is given immediately above it in Table 2. In this example, a ten count deficiency is assumed. Hence, every time comparator 43 finds the value of the bit interchanged numbers in the run memory to be greater than the regular binary numbers in the corresponding reference memory location, a correction pulse will be injected and the number of correction pulses will depend on the magnitude of the error, which is 10 in this example. Referring to Table 2, a row of arrows is used to indicate those places where the run memory exceeds the reference memory count. Thus, when the bit exchanged numbers in Table 2 have values of 56, 60, 58, 54, 62, 57, 61, 59, 55 and 63 there is an arrow indicating that a correction pulse in addition to the normal coincident z pulse is injected. Note that there are a total of 10 arrows corresponding with the 10 bit error. During the run mode when correction pulses are being injected, when any memory location becomes filled, it simply returns to 0 and recycles, making the same proportional correction as in the preceding cycle which was described. Thus, it will be seen that the correction pulses occur at different times and not in uninterrupted succession so they will be more evenly distributed within the area increment of the image being displayed. Corrections are made in real time while the image is being run. The only incremental areas that get no correction are those, 256 in this example, that correspond with the filled memory locations which were produced during the accumulation mode. Hence, each time $A_1$ exceeds $B_1$ in the course of a run count, comparator 43 responds to occurrence of the higher number by enabling gate 44 to trigger a z pulse and an extra intensity change or light spot in the incremental area of the CRO image corresponding with the same run memory and reference memory location and the area increment in the scintillation camera field. The artifically injected light spots may be shifted in space, if desired, by means which are shown in FIG. 3. Mention was made previously of the signals for extra pulses being supplied from gate 44 to the z pulse former 37 by way of line 45. There is also a line 51 in FIG. 3 branching from line 45 to position calculator and logic block 32. The signals on line 51 may be supplied to block 32 in the camera for controlling it to cause a small spatial increment so that the added z pulse is not coincident with the first pulse.

Although sufficient structural and functional descriptions have been set forth to enable anyone knowledgeable in the digital logic and gamma camera arts to reproduce the new nonuniformity correction system, a brief discussion of the timing and control aspects of the system will be given in reference to FIG. 5. In this figure there is a mode control module 79 which is entered and exited by a number of lines. Thus, at the right of mode control module 79 are two lines 92 and 93. These lines are used to supply on and off control signals.

The mode control 79 supplies a pulse over line 94 to clear counter 71 and a pulse over line 76 to zero or clear all memory locations prior to the start of the accumulation and run modes. As mentioned earlier, line 78 to the timing module 85 conducts the signals from gate 77 which, as a result, inhibits counter 71 from incrementing for that filled memory location during the accumulation mode. Line 96 to the mode control receives a pulse from counter/latch 66 when clearing of memory 69 and 70 is complete during initializing. A pulse is supplied from the mode control by way of line 97 to counter/latch 66 to switch it to a state where it will pass the digital signals directly to the memories after the memories have been cleared.

The timing module 85 synchronizes the system. It provides a signal over line 104 to the sample and hold circuits 62 and 63 that endures for the time which it is desired to hold the x and y analog signals so no counts are dropped by the ADCs 48 and 49. There is a hold signal for every z signal that is supplied to the timing module. A signal by way of line 105 triggers the ADCs to convert. It is shorter than the hold signal. A pulse signal from timing module 85 over line 106 causes the latch 66 to go into its count mode. A change of state on line 107 enables the memories. A signal on lines 108 and 109 switches the memories 69 and 70 between their read and write modes. A signal on line 110 causes counter 71 to increment or to be inhibited. A pulse signal on line 111 causes counter 71 to load. A pulse on line 112 coincident with a z pulse input to the timing module 85 causes gate 44 to produce the additional z pulses in response to comparator 43. Although the best mode and apparatus presently has been described for carrying out the principles of the invention, those skilled in the gamma camera and digital electronics arts will appreciate that these principles might be implemented in various ways. For example, shift registers instead of memories could be used to store counts for area increments during each mode and various timing and comparison schemes might be used. Hence, the above description is merely illustrative and to the scope of the invention is to be limited only by construing the claims which follow.

TABLE 1

| 0-63 | 53 | 00 | 01 | 02 | 03 | 04 | 05 | 06 | 07 | 08 | 09 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|---|
| 32 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 | 1 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| 8 | 0 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| 4 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| 2 | 0 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 1 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 10 Bits Low | | | | | | | | | | | | | | | | | | | | | | | | | | | | | | | | | |

| 0-63 | 53 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|---|
| 32 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| 16 | 1 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| 8 | 0 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| 4 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| 2 | 0 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 1 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 10 Bits Low | | | | | | | | | | | | | | | | | | | | | | | | | | | | | | | | | |

TABLE 2

| | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|
| | 0 | 3 | 1 | 4 | 0 | 4 | 2 | 5 | 0 | 3 | 2 | 5 | 1 | 4 | 2 | 6 | 0 | 3 | 1 | 5 | 1 | 4 | 2 | 5 | 0 | 3 | 2 | 5 | 1 | 4 | 3 | 6 |
| | 0 | 2 | 6 | 8 | 8 | 0 | 4 | 6 | 4 | 6 | 0 | 2 | 2 | 4 | 8 | 0 | 2 | 4 | 8 | 0 | 0 | 2 | 6 | 8 | 6 | 8 | 2 | 4 | 4 | 5 | 0 | 2 |
| 32 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 16 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 8 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 0 | 0 | 0 | 0 | 1 | 1 | 1 | 1 | |
| 4 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| 2 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| | | | | | | | | ↑ | | | | | | | | ↑ | | | | | | | | ↑ | | | | ↑ | | | | ↑ |
| | 0 | 3 | 1 | 4 | 0 | 4 | 2 | 5 | 0 | 3 | 2 | 5 | 1 | 4 | 2 | 6 | 0 | 3 | 1 | 5 | 1 | 4 | 2 | 5 | 0 | 3 | 2 | 5 | 3 | 4 | 3 | 6 |
| | 1 | 3 | 7 | 9 | 9 | 1 | 5 | 7 | 5 | 7 | 1 | 3 | 3 | 5 | 9 | 1 | 3 | 5 | 9 | 1 | 1 | 3 | 7 | 9 | 7 | 9 | 3 | 5 | 1 | 7 | 1 | 3 |
| 32 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 |
| 16 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 | 0 | 0 | 1 | 1 |
| 8 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 | 0 | 0 | 0 | 0 | 1 | 1 | 1 | 1 |
| 4 | 0 | 0 | 0 | 0 | 0 | 0 | 0 | 0 | 1 | 1 | 1 | 1 | 1 | 1 | 1 | 1 | 0 | 0 | 0 | 0 | 0 | 0 | 0 | 0 | 1 | 1 | 1 | 1 | 1 | 1 | 1 | 1 |
| 2 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| | | | | | | | | ↑ | | | | | | | | ↑ | | | | | | | | ↑ | | | | ↑ | | | | ↑ |

We claim:

1. In a scintillation camera system comprising means for producing scintillation events over a relatively large area field in response to interception of radiation, a plurality of photosensitive devices adjacent each other on one side of said photosensitive means for producing electric pulses in response to said scintillations, means responsive to said pulses by producing analog signals representing respectively the x and y coordinates of the scintillations in said field, pulse height analyzer means and means responsive to said analyzer means determining that said pulses are within predetermined limits by producing z signals, and display means responsive to coincidence of z signals and said analog signals by producing intensity changes at coordinates corresponding with the coordinates of the scintillations to thereby form an image, improved means for correcting for nonuniformity between the positions of said events and their positions on said display means comprising:

analog-to-digital converter means operative to convert said analog signals to digital x and y coordinate signals, memory means having first locations corresponding respectively with small area increments in said large field and operative in response to occurrence of said digital coordinate signals during an accumulate mode to accumulate and store counts of said events in locations, respectively, substantially corresponding with the positions of said area increments, said counts being made when a uniform radiation source is presented to said means for producing scintillation events, means for determining when a memory location has accumulated a predetermined number of counts of said events during the accumulation mode, means responding to a determination that a particular memory location has accumulated said predetermined number of counts of events by prohibiting the addition of counts to that particular memory location, first means for counting the number of memory locations that have accrued said predetermined number of counts, means responding to said means for counting have counted a selected number of locations containing said predetermined number counts by terminating counting of said events while a plurality of said locations still contain fewer than said predetermined number, said memory means having second locations corresponding respectively with said area increments in said large field and operative in response to said digital coordinate signals occurring during a run mode to store counts of said events in locations, respectively, substantially corresponding with the positions of said area increments, said counts being made when a nonuniform radiation source is presented to said means for producing scintillation events, comparator means operative during said run mode to compare the most significant bits of said accumulated counts from said first locations with a corresponding number of bits for the counts in said second locations, respectively, and to produce correction signals for each location, respectively, substantially equal in number to the difference in counts between the corresponding first and second locations, and means operative in response to said correction signals to produce z signals and, hence, additional intensity changes in corresponding incremental areas of said display means.

2. The nonuniformity correction means as in claim 1 wherein:

said comparator means has first and second input means, the most significant bits of said accumulated counts in one of said first and said second locations being coupled to said first input means and the bits of the counts in the other of said first and said second locations being coupled to said second input means.

3. The nonuniformity correction means as in claim 2 wherein:

said comparator means has first and second input means, means for coupling the most significant bits of said accumulated counts in one of said first and said second locations to said first input means in a predetermined order, means for coupling the bits of said counts in the other of said first and said second locations during said run mode to said second input means with the most significant bits from said one of said first and second locations being interchanged in order with the least significant bits from the other of said first and second locations, whereby to produce said correction signals periodically for each location during said run mode.

4. The system as in claim 2 wherein said counts for events in said second locations of said memory are recycled and returned to zero for beginning another count during the run mode when the number of counts in said second locations, respectively, attain numbers of counts equal to the number represented by said most significant bits of said maximum predetermined number of counts accumulated in said one of said first locations during the accumulate mode.

5. The system as in claim 4 wherein said counts for events in said second location of said memory are recycled and returned to zero for beginning another count during the run mode when the number of counts in said second locations, respectively, attain numbers of counts equal to the number represented by said most significant bits of said maximum predetermined number of counts accumulated in said one of said first locations during the accumulate mode.

6. The nonuniformity correction means as in claim 1 including:

second counting means having a plurality of input lines coupled to said memory means and a plurality of output lines coupled to said memory means, said input lines being for receiving binary numbers representative of the current count in a memory location when a count is to be added to the particular location and to increment said current count by one and return it to said location by way of said output lines, said means for determining when a memory location has accumulated a predetermined number of counts including, gate means having a plurality of inputs coupled respectively to said input lines of said first counting means and having output means, said gate means being operative to change the state of its output means in response to sensing a binary number corresponding with said predetermined number of counts, and means responding to said gate means changing state by inhibiting said counter means from incrementing the count of any memory location having said predetermined number of counts.

7. The nonuniformity means as in claim 1 wherein there are on the order of 4096 memory locations and said selected number of locations which are allowed to accrue said predetermined number of counts are in the range of 50 to 300 locations.

8. The means as in claim 7 wherein said selected number is 256.

* * * * *